United States Patent [19]

Ohuchida

[11] Patent Number: 5,231,620
[45] Date of Patent: Jul. 27, 1993

[54] MAGNETO-OPTICAL RECORDING/REPRODUCING APPARATUS WITH LIGHT BEAM SPLITTING MEANS

[75] Inventor: Shigeru Ohuchida, Zama, Japan

[73] Assignee: Ricoh Company, Ltd., Tokyo, Japan

[21] Appl. No.: 704,782

[22] Filed: May 23, 1991

[30] Foreign Application Priority Data

May 30, 1990 [JP] Japan ................. 2-140881
Jun. 19, 1990 [JP] Japan ................. 2-160561
Jun. 19, 1990 [JP] Japan ................. 2-160562
Jun. 20, 1990 [JP] Japan ................. 2-161696
Apr. 4, 1991 [JP] Japan ................. 3-71286

[51] Int. Cl.⁵ ........................................... G11B 7/135
[52] U.S. Cl. ........................ 369/44.14; 369/44.12; 369/44.37; 369/109; 369/112
[58] Field of Search ............... 369/44.11, 44.14, 44.12, 369/44.24, 44.37, 44.38, 44.41, 44.42, 109, 110, 103, 112; 359/18, 566, 576; 385/37

[56] References Cited

U.S. PATENT DOCUMENTS 4,905,214 2/1990 Nagashima ..................... 369/112
4,983,017 1/1991 Tsuji et al. ........................ 369/109

FOREIGN PATENT DOCUMENTS 64-86337  3/1989 Japan ................. 369/103
1-149237  6/1989 Japan ................. 369/103
1-253841 10/1989 Japan ................. 369/103
2-121131  5/1990 Japan ................. 369/103
2-121139  5/1990 Japan ................. 369/103

Primary Examiner—Aristotelis Psitos
Assistant Examiner—Muhammad Edun
Attorney, Agent, or Firm—Cooper & Dunham

[57] ABSTRACT

In an apparatus for recording and reproducing optical information, a light beam splitter is disposed on an optical path between a laser beam source and an optical information recording medium. The light beam splitter has a three-beam forming diffraction grating on one face of this light beam splitter on a light-emitting side thereof. The light beam splitter also has a light branching diffraction grating on another face thereof. A light beam emitted from the laser beam source is divided into three beams by the three-beam forming diffraction grating. The light branching diffraction grating is used to branch light reflected from the optical information recording medium. A polarizing/separating diffraction grating is formed in the light beam splitter on the same plane as the three-beam forming diffraction grating. The polarizing/separating diffraction grating is used to polarize and separate a light beam branched by the light branching diffraction grating.

4 Claims, 13 Drawing Sheets

POLARIZING DIRECTION

DIFFERENCE θ IN ANGLE BETWEEN GRATING AND POLARIZING DIRECTIONS 26b, 26c 26a, 26d

Fig. 23
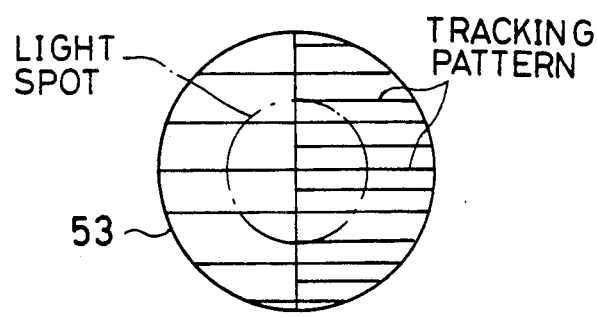
Fig.24a  Fig.24b  Fig.24c
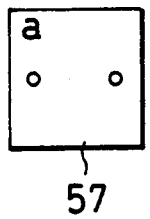
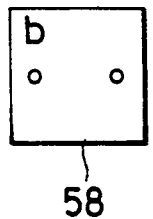
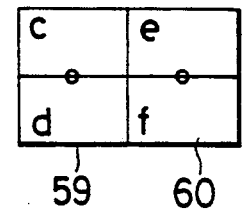

MAGNETO-OPTICAL RECORDING/REPRODUCING APPARATUS WITH LIGHT BEAM SPLITTING MEANS

BACKGROUND OF THE INVENTION

1. Field of the invention

The present invention relates to an optical information recording/reproducing apparatus for recording, reproducing and erasing optical information by using light reflected from an optical information recording medium such as an optical disk.

2. Description of the Related Art

A general apparatus for recording and reproducing optical information is shown in e.g., Japanese Patent Application Laying Open (KOKAI) No. 64-55745. In such an optical information recording/reproducing apparatus, it is possible to cope with a compact disk and a disk of an additional writing type, but it is impossible to cope with a magnetooptic disk of a rewriting type. Further, no magnetooptic signal can be detected since a diffraction element has no function for polarizing and separating light.

In another general apparatus for recording and reproducing optical information, it is impossible to simultaneously detect a magnetooptic single in addition to a focusing error signal and a tracking error signal, and the optical information recording/reproducing apparatus cannot be made compact and these signals cannot be stably detected at any time.

Further, the general optical information recording/reproducing apparatus cannot be cheaply manufactured, and no electric signal can be stably detected at any time irrespective of a change with the passage of time.

Further, in general optical information recording/reproducing apparatus, it is impossible to increase tolerance in assembly of an optical system and adjustment thereof and the construction of the optical information recording/reproducing apparatus cannot be simplified.

Further, in the general optical information recording/reproducing apparatus, no magnetooptic signal can be detected with high sensitivity.

SUMMARY OF THE INVENTION

It is therefore a first object of the present invention to provide an apparatus for recording and reproducing optical information in which it is possible to simultaneously detect a magnetooptic signal in addition to a focusing error signal and a tracking error signal, and the optical information recording/reproducing apparatus can be made compact and these signals can be stably detected at any time.

A second object of the present invention is to provide a compact apparatus for recording and reproducing optical information and cheaply manufactured.

A third object of the present invention is to provide a compact apparatus for recording and reproducing optical information in which an electric signal can be stably detected at any time irrespective of a change with the passage of time.

A fourth object of the present invention is to provide an apparatus for recording and reproducing optical information in which it is possible to increase tolerances in assembly of an optical system and adjustment thereof and the construction of the optical information recording/reproducing apparatus can be simplified.

A fifth object of the present invention is to provide an apparatus for recording and reproducing optical information in which the construction of the optical information recording/reproducing apparatus can be simplified and a magnetooptic signal can be detected with high sensitivity.

A sixth object of the present invention is to provide an apparatus for recording and reproducing optical information in which light utilization efficiency is improved and an optical signal can be detected with high sensitivity and it is possible to increase tolerances in assembly of an optical system and adjustment thereof and the construction of the optical information recording/reproducing apparatus can be simplified.

In accordance with a first structure of the present invention, the above first object can be achieved by an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal detected by detecting light reflected for the optical information recording medium by a light-receiving element; the optical information recording/reproducing apparatus including light beam splitting means arranged on an optical path between the laser beam source and the optical information recording medium, the light beam splitting means comprising a three-beam forming diffraction grating for dividing the light beam emitted from the laser beam source into three beams and formed on one face of the light beam splitting means on a light-emitting side thereof; a light branching diffraction grating for branching the light reflected from the optical information recording medium and on another face of the light beam splitting means; and a polarizing/separating diffraction grating for polarizing and separating a light beam branched by the light branching diffraction grating and formed on the same as the three-beam forming diffraction grating.

In accordance with a second structure of the present invention, the above second object can be achieved by an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal are detected by detecting light reflected from the optical information recording medium by a light-receiving element; the optical information recording/reproducing apparatus including light beam splitting means arranged on an optical path between the laser beam source and the optical information recording medium, the light beam splitting means comprising a beam shaping element for converging the light beam emitted from the laser beam source in one direction and formed on one face of the light beam splitting means on a light-emitting side thereof; a light branching diffraction grating for branching the light reflected from the optical information recording medium and formed on another face of the light beam splitting means; and a polarizing/separating diffraction grating for polarizing and separating a light beam branched by the light branching diffraction grating and having diffraction efficiencies different from each other in accordance with a polarizing direction, the polarizing/separating diffraction grating being formed on the same plane as the beam shaping element.

In accordance with a third structure of the present invention, the above third object can be achieved by the second structure of the present invention constructed such that the beam shaping element, the light branching diffraction grating and the polarizing/separating diffraction grating forming the light beam splitting means are integrally molded on a substrate made of glass or plastic.

In accordance with a fourth structure of the present invention, the above fourth object can be achieved by an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal are detected by detecting light reflected from the optical information recording medium by a light-receiving element; the optical information recording/reproducing apparatus comprising first light beam splitting means arranged on an optical path between the laser beam source and the collimator lens and having a light branching diffraction grating for separating the emitted and reflected lights into zeroth order light and plus and minus first order lights; and second light beam splitting means arranged on one of optical paths of the plus and minus first order lights obtained by transmitting the reflected light from the optical information recording medium through the first light beam splitting means, the second light beam splitting means including a polarizing/separating diffraction grating having diffraction efficiency depending on a polarizing direction.

In accordance with a fifth structure of the present invention, the above fifth object can be achieved by an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal are detected by detecting light reflected from the optical information recording medium by a light-receiving element; the optical information recording/reproducing apparatus comprising first light beam splitting means arranged on an optical path between the laser beam source and the collimator lens and having a light branching diffraction grating for separating the emitted and reflected lights into zeroth order light and plus and minus first order lights; and second light beam splitting means arranged on one of optical paths of the plus and minus first order lights obtained by transmitting the reflected light from the optical information recording medium through the first light beam splitting means; the second light beam splitting means including a prism, a ½ wavelength plate and a polarizing/separating diffraction grating having diffraction efficiency depending on a polarizing direction; and the prism, the ½ wavelength plate and the polarizing/separating diffraction grating being integrally formed.

In accordance with a sixth structure of the present invention, the above object can be achieved by an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal are detected by detecting light reflected from the optical information recording medium by a light-receiving element; the optical information recording/reproducing apparatus comprising first light beam splitting means arranged on an optical path between the laser beam source and the collimator lens and having a light branching diffraction grating for separating the emitted and reflected lights into zeroth order light and plus and minus first order lights; and second light beam splitting means arranged on one of optical paths of the plus and minus first order lights obtained by transmitting the reflected light from the optical information recording medium through the first light beam splitting means, the second light beam splitting means including a polarizing/separating diffraction grating having diffraction efficiency depending on a polarizing direction; the light branching diffracting grating having an asymmetric shape within one periodic pitch thereof on right-handed and left-handed sides of this light branching diffraction grating.

In the first structure of the present invention, the light beam splitting means is formed by three diffraction grating composed of the three-beam forming diffraction grating, the light branching diffraction grating and the polarizing/separating diffraction grating. Accordingly, it is possible to simultaneously detect a magnetooptic signal in addition to the focusing error signal and the tracking error signal. Therefore, the optical information recording/reproducing apparatus can be made compact and these signals can be stably detected at any time.

In the second structure of the present invention, the light beam splitting means is formed by three constructional elements composed of the beam shaping element, the light branching diffraction grating and the polarizing/separating diffraction grating. Accordingly, it is possible to simultaneously provide three functions composed of a beam shaping function, a light branching function and a polarizing/separating function for the light beam splitting means as a single constructional member. Therefore, the optical information recording/reproducing apparatus can be made compact and cheaply manufactured.

In the third structure of the present invention, the beam shaping element, the light branching diffraction grating and the polarizing/separating diffraction grating are integrally molded on a substrate made of glass or plastic. Accordingly, the optical information recording/reproducing apparatus can be made compact and the above signals can be stably detected at any time irrespective of a change with the passage of time.

In the fourth structure of the present invention, a magnetooptic signal can be detected by using one of the plus and minus first order lights branched by transmitting the reflected light from the optical information recording medium through the light branching diffraction grating. The focusing error signal and the tracking error signal can be detected by using the other first order light through the polarizing/separating diffraction grating. Accordingly, it is possible to increase tolerances in assembly of an optical system and adjustment thereof. Further, the construction of the optical information recording/reproducing apparatus can be simplified by disposing the light branching diffraction grating and the polarizing/separating diffraction grating.

In the fifth structure of the present invention, the construction of the optical information recording/reproducing apparatus can be simplified by using the light branching diffraction grating and the polarizing/separating diffraction grating. Further, the prism is disposed on an optical path for detecting a magnetooptic signal so that an apparent Kerr rotational angle of light incident to this prism at a Brewster angle is increased. Accordingly, the magnetooptic signal can be detected with high sensitivity.

In the sixth structure of the present invention, the light branching diffracting grating for separating the emitted and reflected lights into the zeroth order light and the plus and minus first order lights has an asymmetric shape within one periodic pitch thereof on the right-handed and left-handed sides of this light branching diffraction grating. Accordingly, it is possible to change the diffraction efficiency of each of the plus and minus first order lights branched by transmitting the reflected light from the optical information recording medium through the light branching diffraction grating. Therefore, light intensity with respect to a magnetooptic signal can be adjusted such that this light intensity is increased. Thus, light utilization efficiency is improved and an optical signal can be detected with high sensitivity in comparison with the general optical information recording/reproducing apparatus. Further, the magnetooptic signal is detected by using one of the plus and minus first order lights branched by the light branching diffraction grating. The focusing error signal and the tracking error signal are detected by transmitting the other first order light through the polarizing/separating diffraction grating. Accordingly, it is possible to increase tolerances in assembly of an optical system and adjustment thereof. Further, the construction of the optical information recording/reproducing apparatus can be simplified by disposing the light branching diffraction grating and the polarizing/separating diffraction grating.

Further objects and advantages of the present invention will be apparent from the following description of the preferred embodiments of the present invention as illustrated in the accompanying drawings.

BRIEF DESCRIPTION OF THE DRAWINGS

FIG. 23 is an explanatory view showing the relation between a grating direction of a light branching diffraction grating and the direction of a tracking pattern in the fifth embodiment;

FIGS. 24a, 24b and 24c are front views of light-receiving elements in the fifth embodiment;

FIG. 25b is a front view of a light-receiving element for receiving light through the light branching diffraction grating shown in FIG. 25a;

FIG. 26b is a front view of a light-receiving element for receiving light through the light branching diffraction grating shown in FIG. 26a.

DESCRIPTION OF THE PREFERRED EMBODIMENTS

The preferred embodiments of an apparatus for recording and reproducing optical information in the present invention will next be described in detail with reference to the accompanying drawings.

Figure 1:
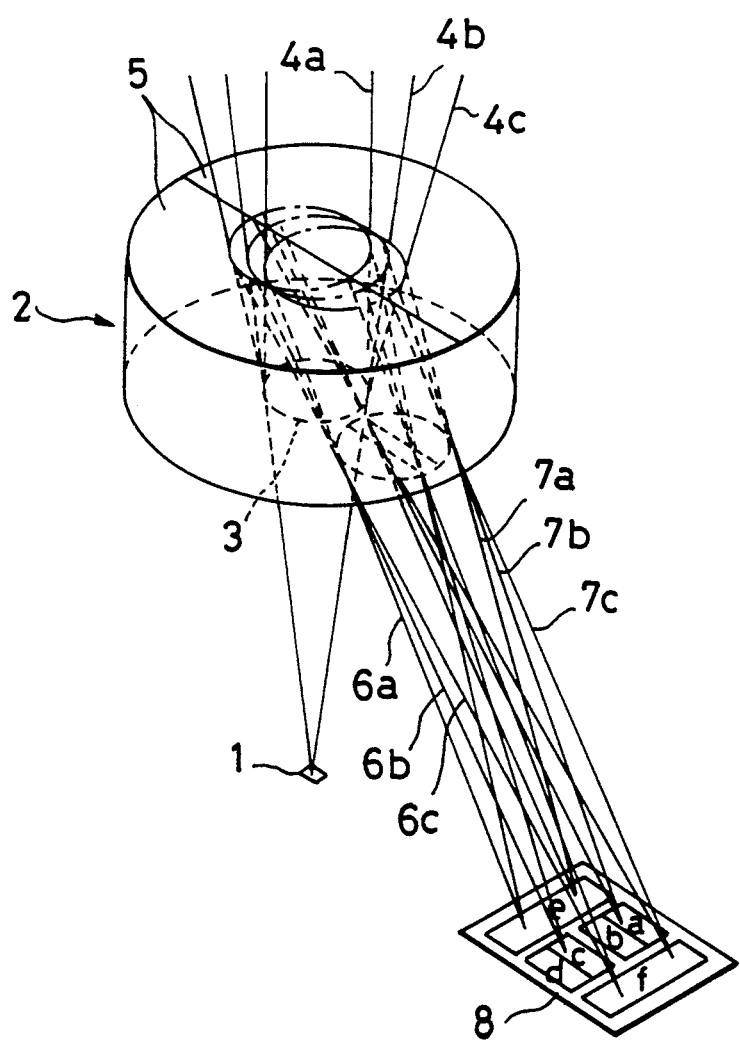
FIG. 1 is a view showing the construction of a general apparatus for recording and reproducing optical information.

A general apparatus for recording and reproducing optical information is shown in FIG. 1. In FIG. 1, light emitted from a laser beam source 1 is incident onto a diffraction grating face 3 formed on one face of a diffraction element 2 and is separated into three light beams 4a, 4b and 4c of zeroth and plus and minus first orders. These three light beams are transmitted through a holographic grating face 5 formed on another face of the diffraction element 2. Thereafter, the three light beams are converged by an unillustrated objective lens and are irradiated onto a surface of an unillustrated optical disk as an optical information recording medium. At this time, the zeroth order light 4a is used to read the optical information, and the plus and minus first order lights 4b and 4c are used to detect a tracking state on the surface of the optical disk and are then reflected from the optical disk. The reflected first order lights 4b and 4c are again incident onto the holographic grating face 5 of the diffraction element 2. The three light beams incident onto the holographic grating face 5 are respectively diffracted and divided into two sets of three beams 6a, 6b, 6c, 7a, 7b and 7c as a total of six beams. These six beams 6a, 6b, 6c, 7a, 7b and 7c are guided onto a surface of a light-receiving element 8.

The light-receiving element 8 has six divided light-receiving faces a, b, c, d, e and f. The above six beams are respectively guided onto these six light-receiving faces as light spots. Thus, it is possible to detect an information reproducing signal Rf, a focusing error signal Fo and a tracking error signal Tr.

These signals can be respectively detected on the basis of the following formulas using a wedge prism method.

$$Fo = (a+d) - (b+c) \quad (1)$$

$$Tr = e - f \quad (2)$$

$$Rf = a + b + c + d \quad (3)$$

Figure 2A:
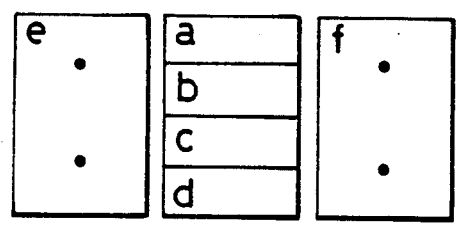
FIGS. 2a, 2b and 2c are front views showing a light-receiving state of a light-receiving element on a surface thereof when a focusing error signal is detected.
Figure 2B:
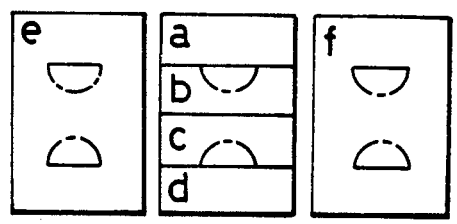
Figure 2C:
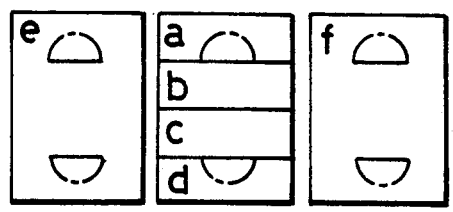

FIGS. 2a to 2c show light-receiving states of the light spots irradiated onto the surface of the light-receiving element 8 when the focusing error signal Fo is detected. FIG. 2a shows light-receiving states of the light spots at a focusing time. FIG. 2b shows light-receiving states of the light spots when the optical disk approaches the light-receiving element 8 in comparison with a position of the optical disk at the focusing time. FIG. 2c shows light-receiving states of the light spots when the optical disk is moved away from the position thereof at the focusing time. It is possible to detect the above signals by using increase and decrease in beam diameter of each of the light spots.

In the above optical information recording/reproducing apparatus, the beam source 1 and the light-receiving element 8 can be arranged on the same plane by disposing the diffraction element 2. Accordingly, the reproducing signal, the focusing error signal and the tracking error signal can be stably detected by a compact structure. Further, it is possible to cope with a compact disk and a disk of an additional writing type by such a structure. However, it is impossible to cope with a magnetooptic disk of a rewriting type in such a structure. Further, no magnetooptic signal can be detected since the diffraction element 2 has no function for polarizing and separating light.

An apparatus for recording and reproducing optical information in accordance with a first embodiment of the present invention will next be described in detail with reference to FIGS. 3 to 7.

Figure 3:
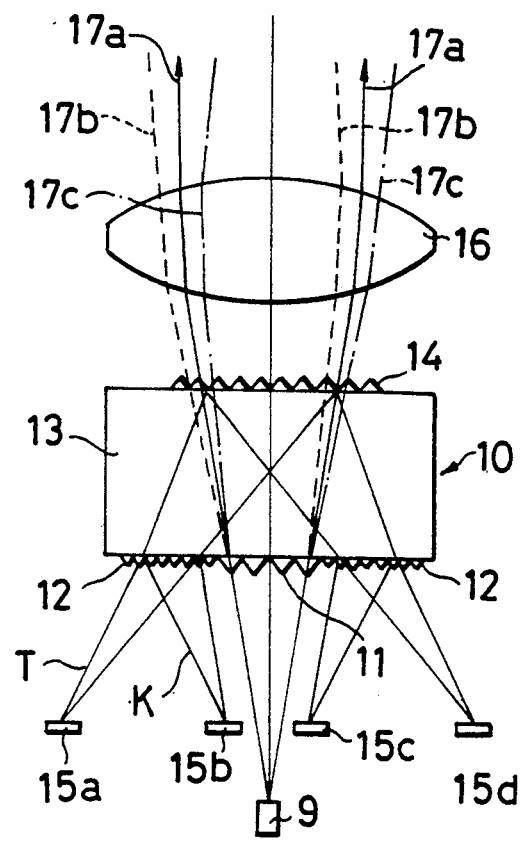
FIG. 3 is a view showing the construction of an apparatus for recording and reproducing optical information in accordance with a first embodiment of the present invention.

In FIG. 3, a semiconductor laser 9 is disposed as a laser beam source. A light beam splitting element 10 as a means for splitting a light beam is arranged on a light-emitting optical path of the semiconductor laser 9. A diffraction grating 11 for forming three beams is formed in the light beam splitting element 10 and is located in a central portion of this light beam splitting element 10 on one face thereof on a side of the light-emitting optical path. A diffraction grating 12 for polarizing and separating light is formed in a peripheral portion of the three-beam forming diffraction grating 11 on the same plane as this three-beam forming diffraction grating 11. A diffraction grating 14 for branching light is formed on another face of the light beam splitting element 10 opposite to the one face thereof with respect to a substrate 13. Four light-receiving elements 15a, 15b, 15c and 15d are located on the light-emitting optical path side of the light beam splitting element 10. Further, a collimator lens 16, an objective lens and a magneto-optical disk as an optical information recording medium are disposed on an optical path on a side of the light beam splitting element 10 opposite to the light-emitting optical path side with respect to the substrate 13. The objective lens and the magneto-optical disk are not shown in FIG. 3.

In such an optical information recording/reproducing apparatus, light emitted from the semiconductor laser 9 is incident to the three-beam forming diffraction grating 11 in the light beam splitting element 10. This incident light is divided into three beams composed of zeroth order light 17a, plus first order light 17b and minus first order light 17c. For example, the three-beam forming diffraction grating 11 has about 15 μm in grating pitch and about 300 nm in groove depth. Further, a beam spectral ratio of the zeroth order light 17a, the plus first order light 17b and the minus first order light 17c can be set to about 1:4:1. The three divided beams are then incident to the light branching diffraction grating 14 through the substrate 13.

For example, this light branching diffraction grating 14 has about 2 μm in grating pitch and about 400 nm in groove depth, and a light branching ratio of the light branching diffraction grating 14 can be set to about 1:2:1. These values depend on light branching angles.

The three light beams are respectively transmitted through the collimator lens 16 after the light branching diffraction grating 14 of the light beam splitting element 10. At this time, only the zeroth order light 17a is changed to a parallel light beam. Thereafter, the three light beams composed of the zeroth order light 17a, the plus first order light 17b and the minus first order light 17c transmitted through the collimator lens 16 are converged by the objective lens and are irradiated onto a surface of the magneto-optical disk, thereby recording optical information onto this magneto-optical disk, etc. A plane of polarization of each of the three light beams reflected from the magneto-optical disk is rotated by Kerr effect. Then, the three light beams are again incident to the light branching diffraction grating 14 of the light beam splitting element 10 through the collimator lens 16. At this time, it is possible to detect an electric signal by using the plus and minus first order lights of the three light beams. A method for detecting the electric signal by using the plus first order light 17b will be described in the following description.

Figure 4:
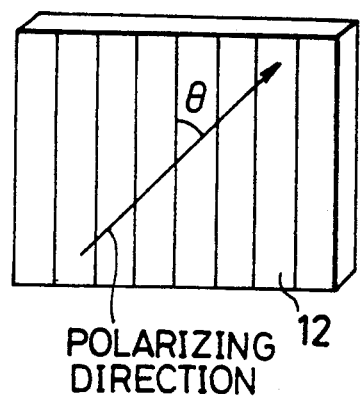
FIG. 4 is a perspective view showing an operating state of a diffraction grating for polarizing and separating light.
Figure 5:
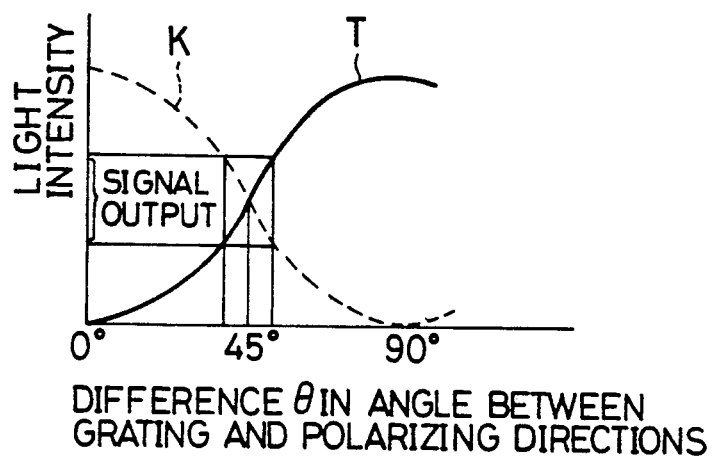
FIG. 5 is a graph showing optical characteristics of the polarizing/separating diffraction grating.

The plus first order light 17b is incident to the polarizing/separating diffraction grating 12 through the substrate 13 and is separated into transmission light T and diffraction light K. This polarizing/separating diffraction grating 12 has a small pitch and deep grooves. As shown in FIGS. 4 and 5, with respect to this polarizing/separating diffraction grating 12, light intensities of the transmission light T and the diffraction light K are changed by a difference $\theta$ in angle between grating and polarizing directions. For example, the polarizing/separating diffraction grating 12 has about 0.5 $\mu$m in grating pitch and about 1 $\mu$m in groove depth and has an aspect ratio of 2.0 such that this polarizing-separating diffraction grating 12 has the above optical characteristics about the change in light intensity. The polarizing/separating diffraction grating 12 has a large aspect ratio in comparison with the three-beam forming diffraction grating 11 and the light branching diffraction grating 14. Such a structure constitutes one of the features of the present invention.

Figure 6A:
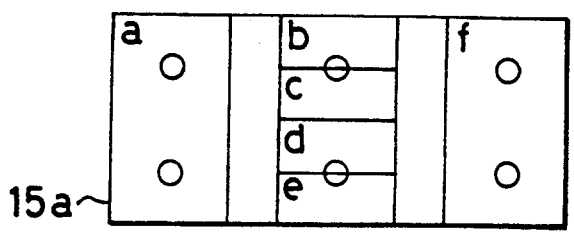
FIGS. 6a and 6b are front views showing light-receiving states of light-receiving elements for detecting various kinds of electric signals.
Figure 6B:
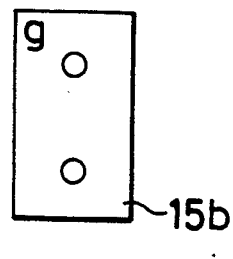

Various kinds of electric signals with respect to such transmitted and diffracted light beams can be detected by using light-receiving faces a, b, c, d, e, f and g of the light-receiving elements 15a and 15b shown in FIGS. 6a and 6b. Namely, a focusing error signal Fo using a wedge prism method, a tracking error signal Tr using a three-beam tracking method, and a magneto-optical signal Rf as a reproducing signal using a differential method can be provided by using the following formulas.

$$Fo = (b+e) - (c+d) \quad (4)$$

$$Tr = (a-f) \quad (5)$$

$$Rf = (b+c+d+e) - g \quad (6)$$

As mentioned above, the polarizing/separating diffraction grating 12 is formed in the light beam splitting element 10 in addition to the three-beam forming diffraction grating 11 and the light branching diffraction grating 14. Accordingly, it is possible to cope with a rewritable magneto-optical disk without almost changing general constructional elements such as the diffraction element 2 shown in FIG. 1. Further, in such a structure, it is possible to provide an optical head which is compact and light in weight and is cheaply manufactured. In this embodiment, the various kinds of electric signals are detected by only the plus first order light 17b can be detected with high sensitivity if the light-receiving elements 15c and 15d are used.

Figure 7A:
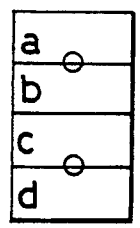
FIGS. 7a and 7b are front views showing modified examples of the light-receiving elements.
Figure 7B:
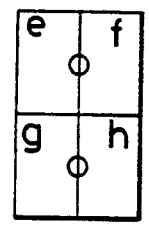

FIGS. 7a and 7b show modified examples of the light-receiving elements. A push-pull method has recently been used as a general tracking detecting method with respect to the magneto-optical disk in comparison with the three-beam tracking method. The shapes of the light-receiving elements can be changed to shapes shown in FIGS. 7a and 7b in accordance with a structure in which the three-beam forming diffraction grating 11 is removed from the above light beam splitting element 10. In this case, the focusing error signal Fo, the tracking error signal Tr and the magneto-optical signal Rf detected on light-receiving faces a to h of the light-receiving elements can be provided by the followings formulas.

$$Fo = (a+d) - (b+c) \quad (7)$$

$$Tr = (e+g) - (f+h) \quad (8)$$

$$Rf = (a+b+c+d) - (e+f+g+h) \quad (9)$$

Figure 8:
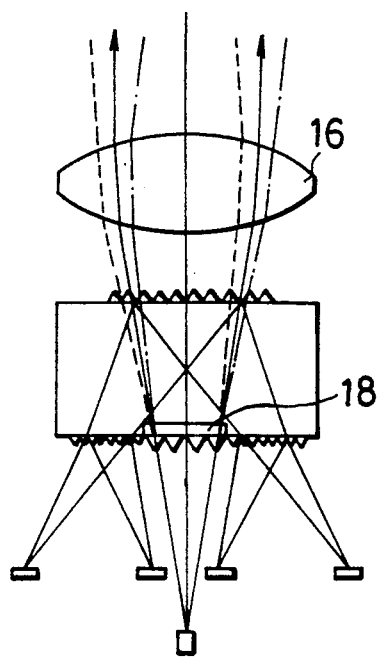
FIG. 8 is a constructional view showing a modified example of the apparatus for recording and reproducing optical information in accordance with the first embodiment of the present invention.

A modified example of the optical information recording/reproducing apparatus in the first embodiment of the present invention will next be described with reference to FIGS. 8 and 9. In this modified example, a $\lambda/2$ plate 18 is newly disposed and located inside the substrate 13 having the three-beam forming diffraction grating 11 in the light beam splitting element 10. The other constructions are similar to those in the first embodiment shown in FIG. 3. The $\lambda/2$ plate 18 is disposed for the following reasons.

Namely, as shown in FIGS. 4 and 5, an angle between the grating direction of the polarizing/separating diffraction grating 12 having a small pitch and a polarizing direction of light emitted from the semiconductor laser 9 can be set to 45° since the $\lambda/2$ plate 18 is disposed. In general, the light emitted from the semiconductor laser has a far-field pattern having an elliptical shape and the polarizing direction of this light is parallel to a direction of the minor axis of an ellipse. In the above first embodiment, a body of a semiconductor laser section and the light beam splitting element 10 in the present invention must be adjusted and attached to the optical information recording/reproducing apparatus in advance such that an angle between the grating direction of the polarizing/separating diffraction grating 12 and the polarizing direction of light reflected from the magneto-optical disk can be set to 45°±$\Delta\theta$. Accordingly, it is necessary to increase the branching angle of the light branching diffraction grating 14 and the thickness of the substrate 13, which is very troublesome in operation of the optical information recording/reproducing apparatus.

Figure 9:
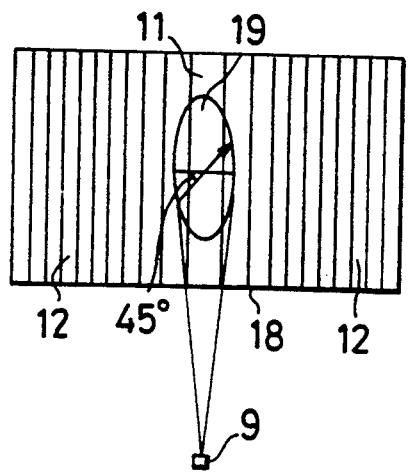
FIG. 9 is a front view showing a state in which a light spot extending in a vertical direction is incident onto one face of a light beam splitting element.

Therefore, the $\lambda/2$ plate 18 is formed within the substrate 13 and a major axis direction of a light spot 19 is adjusted such that this major axis direction is parallel to the grating direction of the diffraction grating 12 as shown in FIG. 9 and an angle between this grating direction and the above polarizing direction is set to 45°. Thus, it is possible to reduce the branching angle and the thickness of the substrate 13 and make the entire light beam splitting element 10 compact and light in weight.

Figure 10:
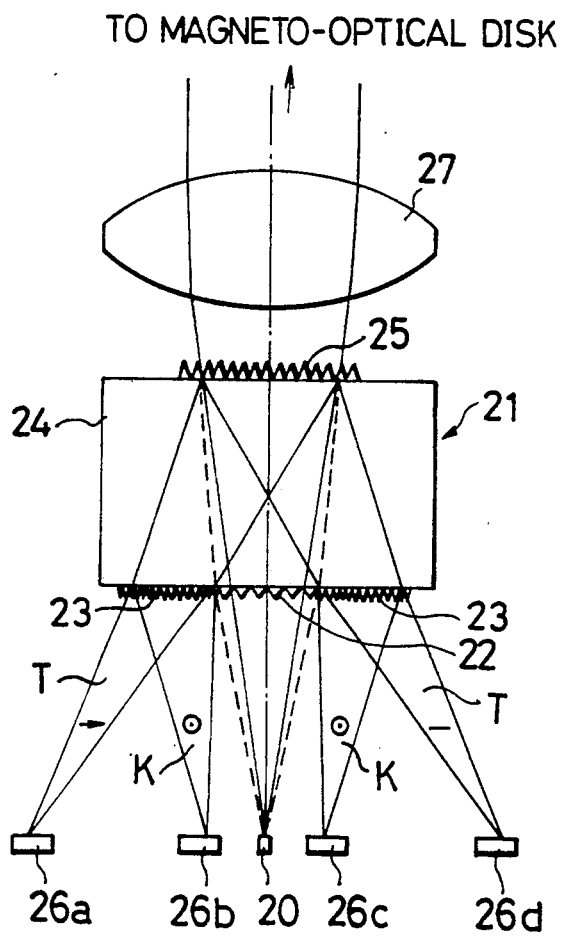
FIG. 10 is a view showing the construction of an apparatus for recording and reproducing optical information in accordance with a second embodiment of the present invention.

An apparatus for recording and reproducing optical information in a second embodiment of the present invention will next be described with reference to FIGS. 10 to 15. In FIG. 10, a light beam splitting element 21 as a means for splitting a light beam is disposed on an optical path of light emitted from a semiconductor laser 20 as a laser beam source. A cylindrical micro-Fresnel lens 22 as a beam shaping element is formed in the light beam splitting element 21 and is located in a central portion of this light beam splitting element 21 on one face thereof on a side of the light-emitting optical path. A diffraction grating 23 for polarizing and separating light is formed in a peripheral portion of the cylindrical micro-Fresnel lens 22 on the same plane as this cylindrical micro-Fresnel lens 22. A diffraction grating 25 for branching light is formed on another face of the light beam splitting element 21 opposite to the one face thereof with respect to a substrate 24. Four light-receiving elements 26a, 26b, 26c and 26d are located on the light-emitting optical path side of the light beam splitting element 21. A collimator lens 27, and objective lens and a magneto-optical disk as an optical information recording medium are disposed on an optical path on a side of the light beam splitting element 21 opposite to the light-emitting optical path side thereof with respect to the substrate 24. The objective lens and the magneto-optical disk are not shown in FIG. 10.

Figure 11:
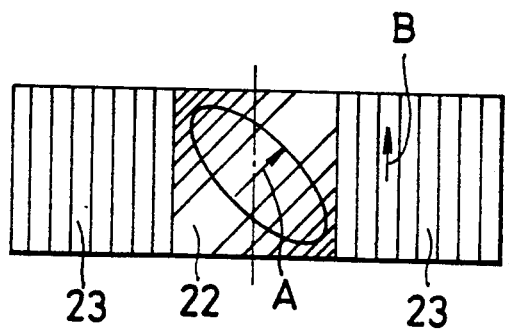
FIG. 11 is a front view showing the shapes of a beam shaping element and a diffraction grating for polarizing and separating light in the second embodiment.

FIG. 11 shows shapes of the polarizing/separating diffraction grating 23 and the cylindrical micro-Fresnel lens 22 formed on the one face of the light beam splitting element 21. The cylindrical micro-Fresnel lens 22 and the polarizing/separating diffraction grating 23 are arranged such that an angle between a polarizing direction A of the light emitted from the semiconductor laser 20 and a grating direction B of the polarizing/separating diffraction grating 23 is set to 45°.

Figure 14:
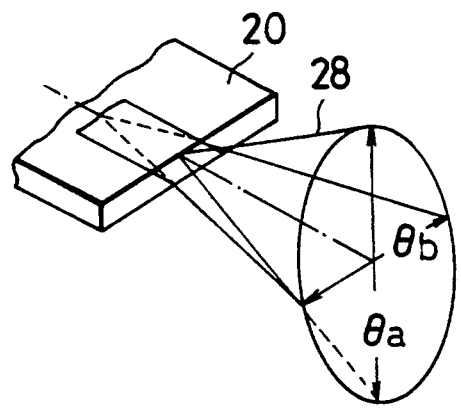
FIG. 14 is a perspective view showing a light-emitting pattern of a laser beam source.
Figure 15:
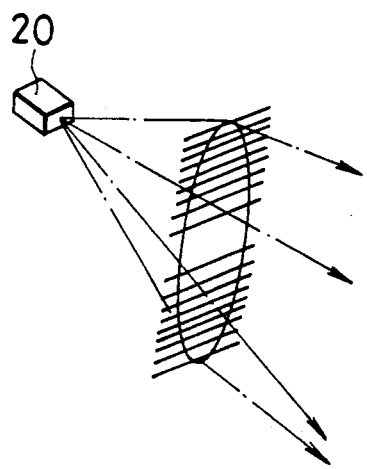
FIG. 15 is a perspective view showing a means for reducing the diameter of a laser beam in one direction thereof.

In such an optical information recording/reproducing apparatus, the light emitted from the semiconductor laser 20 is incident to the cylindrical micro-Fresnel lens 22 of the light beam splitting element 21. The cylindrical micro-Fresnel lens 22 is disposed for the following reasons. As shown in FIG. 14, a beam 28 of diffused light from the semiconductor laser 20 has an elliptical shape. Accordingly, light utilization efficiency is reduced to obtain a circular light spot on the unillustrated magneto-optical disk when no beam is shaped. Therefore, as shown in FIG. 15, the cylindrical micro-Fresnel lens 22 is disposed to reduce a beam diameter $\theta a$ in one direction at a large light-emitting angle. Namely, the cylindrical micro-Fresnel lens 22 is disposed to shape the light beam. In this case, with respect to the cylindrical micro-Fresnel lens 22, it is not necessary to increase numerical aperture (NA) since it is sufficient to simply reduce the beam diameter $\theta a$. Accordingly, it is possible to provide the cylindrical micro-Fresnel lens 22 having a high diffraction efficiency. The cylindrical micro-Fresnel lens 22 used in this embodiment is of a diffraction grating type, but can be also manufactured by etching and VCD. Further, similar effects can be obtained by forming a distribution of a refractive index within the substrate 13 by ion exchange, etc. to provide a cylindrical lens action.

Figure 12A:
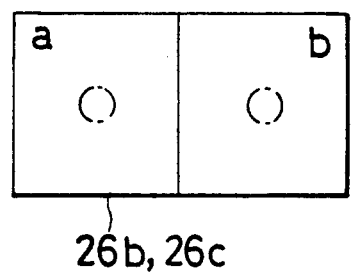
FIGS. 12a and 12b are front views showing the shapes of light-receiving elements in the second embodiment.
Figure 12B:
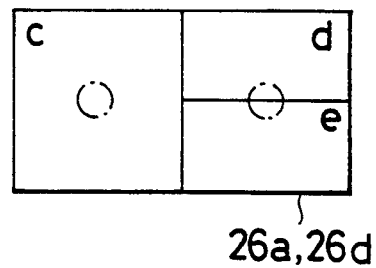

The light beam shaped by the cylindrical micro-Fresnel lens 22 is transmitted through the substrate 24 and is emitted to the exterior of the light beam splitting element 21 through the light branching diffraction grating 25. After the light beam is then changed to a parallel light beam by the collimator lens 27, the light beam is converged by an objective lens and is irradiated onto the magneto-optical disk, thereby recording optical information onto the magneto-optical disk, etc. The optical information is read out of the magneto-optical disk, and a plane of polarization of the light reflected from the magneto-optical disk is rotated by Kerr effect. This reflected light is again converged by the controlling lens 27 and is incident to the light branching diffraction grating 25. Thus, this incident light is changed to plus and minus first order diffracted lights. The plus and minus first order diffracted lights are incident to the polarizing/separating diffraction grating 23 through the substrate 24 and are then separated into transmission light T and diffraction light K every polarizing direction. The transmission light T is guided to the light-receiving elements 26a and 26d, and the diffraction light K is guided to the light-receiving elements 26b and 26c. As shown in FIG. 12a, each of the light-receiving elements 26b and 26c has two divided light-receiving faces a and b. As shown in FIG. 12b, each of the light receiving elements 26a and 26d has three divided light-receiving faces c, d and e.

A magneto-optical signal can be detected by calculating a difference in intensity between the transmission light T and the diffraction light K using these four light-receiving elements 26a, 26b, 26c and 26d. Further, it is also possible to detect a focusing error signal Fo and a tracking error signal Tr by the above difference in intensity. In this case, the focusing error signal Fo and the tracking error signal Tr can be respectively provided by Foucault and push-pull method using the following formulas.

$$Fo = d - e \tag{10}$$

$$Tr = a - b \text{ or } c - (d + e) \tag{11}$$

Figure 13:
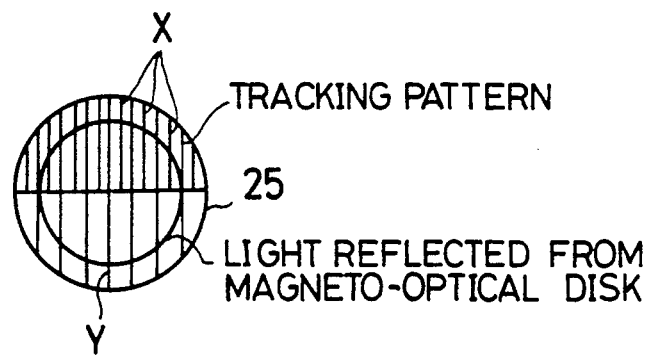
FIG. 13 is an explanatory view showing the relation in position between grating and tracking directions of a light branching diffracting grating.

As shown in FIG. 13, when these signals are detected, it is necessary that a tracking direction X is in conformity with a grating direction Y of the light branching diffraction grating 25 in advance.

As mentioned above, the light beam splitting element 21 has the cylindrical micro-Fresnel lens 22, the light branching diffraction grating 25 and the polarizing/separating diffraction grating 23. Accordingly, the single light beam splitting element 21 simultaneously has three functions composed of a function for shaping a light beam, a function for branching light and a function for polarizing and separating light so that the entire optical information recording/reproducing apparatus can be made compact and cheaply manufactured.

In the above embodiment, the cylindrical micro-Fresnel lens 22, the light branching diffraction grating 25 and the polarizing/separating diffraction gratings 23 constituting the light beam splitting element 21 can be integrally molded on the substrate 24 made of glass or plastic. In such a structure, the optical information recording/reproducing apparatus can be made compact and the above signals can be stably detected at any time irrespective of a change with the passage of time.

Figure 16:
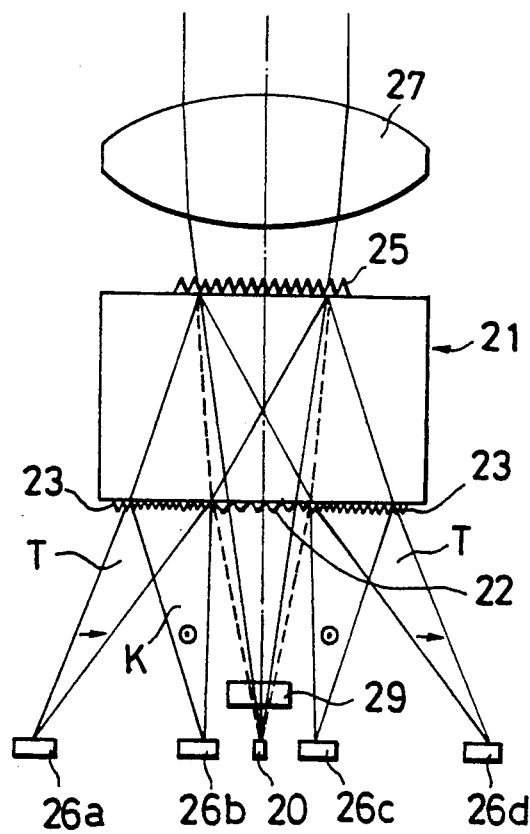
FIG. 16 is a constructional view showing a modified example of the apparatus for recording and reproducing optical information in accordance with the second embodiment of the present invention.

A modified example of the optical information recording/reproducing apparatus in the second embodiment of the present invention will next be described with reference to FIG. 16. In this modified example, a ½ wavelength plate 29 is newly disposed on an optical path between the semiconductor laser 20 for emitting a laser beam and the cylindrical micro-Fresnel lens 22 of the light beam splitting element 21. The other constructions are similar to those in the above second embodiment.

Since the ½ wavelength plate 29 is disposed, it is possible to adjust a polarizing direction A of light emitted from the semiconductor laser 20 such that this polarizing direction A is inclined 45° with respect to the grating direction of the polarizing/separating diffraction grating 23 as shown in FIG. 11. Namely, the above polarizing direction can be rotated without rotating a body of the semiconductor laser so that beam shaping is optimized and an unbalance of a magneto-optical signal can be simultaneously corrected. Accordingly, it is possible to correct a shift in grating direction caused when the various kinds of diffraction gratings are manufactured. Further, the optical information recording/reproducing apparatus can be constructed such that no detection of various kinds of electric signals is adversely affected by this shift in grating direction. Further, no high accuracy in manufacture of each of the diffraction gratings is required and yield is improved so that the optical information recording/reproducing apparatus can be cheaply manufactured.

Figure 17:
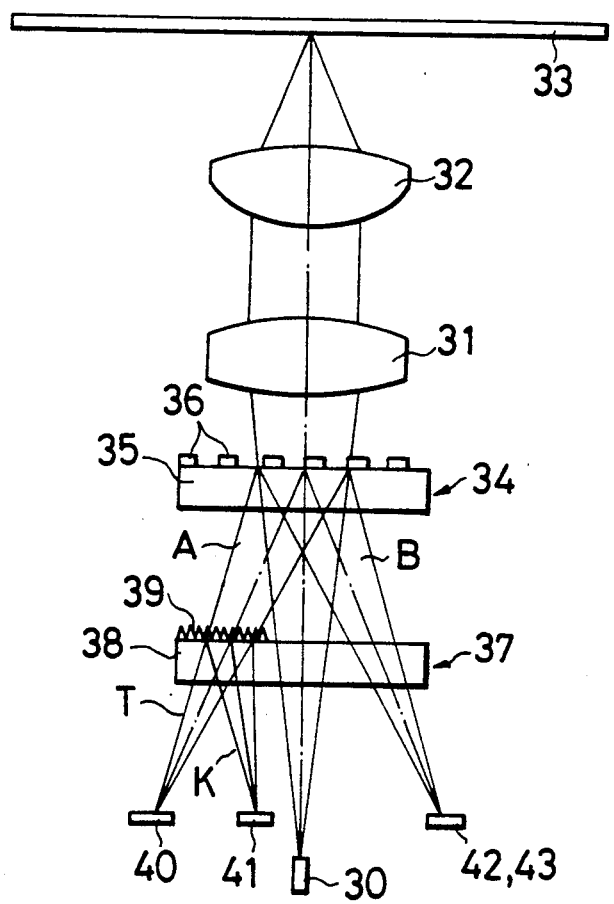
FIG. 17 is a view showing the construction of an apparatus for recording and reproducing optical information in accordance with a third embodiment of the present invention.
Figure 18:
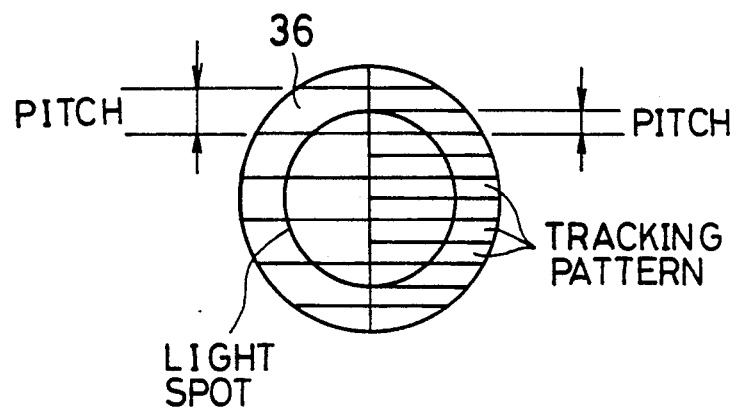
FIG. 18 is an explanatory view showing a grating direction of a light branching diffraction grating and the direction of a tracking pattern in the third embodiment.

An optical information recording/reproducing apparatus in a third embodiment of the present invention will next be described with reference to FIGS. 17 to 19, In FIG. 17, light is emitted from a semiconductor laser 30 as a laser beam source and is changed to a parallel light beam by a collimator lens 31. The parallel light beam is then converged by an objective lens 32 and is irradiated onto a face of a magneto-optical disk 33 as an optical information recording medium. Thereafter, light reflection from the magneto-optical disk 33 is again transmitted through the collimator lens 31. A first light beam splitting element 34 as a first light beam splitting means is disposed on an optical path from the collimator lens 31 to the semiconductor laser 30. A light branching diffraction grating 36 is formed on a substrate 35 in the first light beam splitting element 34 and is located on a side of the light beam splitting element 34 facing the collimator lens 31.

Figures 19A, 19B, 19C:
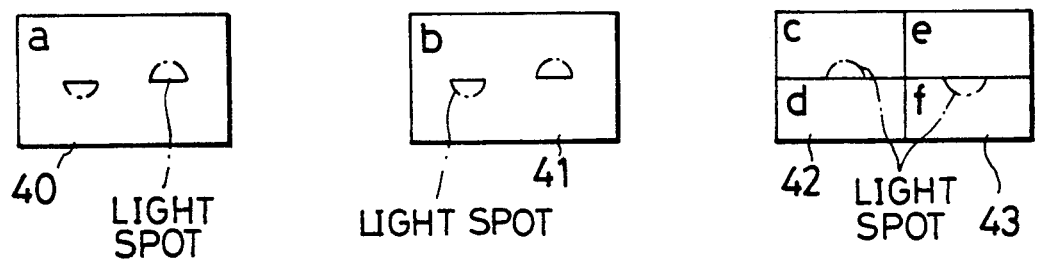
FIGS. 19a, 19b and 19c are front views showing light-receiving states of light-receiving elements in the third embodiment.

A second light beam splitting element 37 is disposed between the first light beam splitting element 34 and the semiconductor laser 30. A diffraction grating 39 for polarizing and separating light is formed on a substrate 38 in the second light beam splitting element 37 and is located on a side of the second light beam splitting element 37 facing the first light beam splitting element 34. Light-receiving elements 40 and 43 shown in FIGS. 19a to 19c are disposed between the second light beam splitting element 37 and the semiconductor laser 30.

In such an optical information recording/reproducing apparatus, light emitted from the semiconductor laser 30 is incident to the light branching diffraction grating 36 of the first light beam splitting element 34 through the substrate 38 of the second light beam splitting element 37. Thus, zeroth order light of the incident light is transmitted toward the collimator lens 31 and is changed to a parallel light beam by this collimator lens 31. The parallel light beam is converged by the objective lens 32 on a face of the magneto-optical disk 33, thereby recording optical information onto the magneto-optical disk 33, etc. A plane of polarization of light provided as an electric signal read on the magneto-optical disk is rotated by Kerr effect and this light is reflected from the magneto-optical disk 33. The reflected light is again incident to the light branching diffraction grating 36 through the objective lens 32 and the collimator lens 31, thereby forming plus first order light A and minus first order light B. The plus first order light A is incident to the polarizing/separating diffraction grating 39 in the second light beam splitting element 37. Thus, this plus first order light A is separated into transmission light T and diffraction light K by the polarizing/separating diffraction grating 37. The transmission light T and the diffraction light K are respectively guided to the light-receiving elements 40 and 41. As shown in FIG. 18, the polarizing/separating diffraction grating 39 has a small pitch and deep grooves, and diffraction efficiency of this polarizing/separating diffraction grating 39 depends on a polarizing direction of the incident light. The polarizing/separating diffraction grating 39 is an element for obtaining effects similar to those of PBS and a Wollaston prism used as a so-called general polarizing/separating element. Accordingly, a magneto-optical signal Rf can be detected by such a structure from a difference in intensity between the transmission light T and the diffraction light K using difference calculus. As shown in FIGS. 19a and 19b, it is not necessary to divide the two light-receiving elements 40 and 41 and a shift in position of a light spot caused by a change in wavelength thereof can be sequentially absorbed by the size of a light-receiving face of each of these light-receiving elements.

The minus first order light B is divided into two light beams by the light branching diffraction grating 39. As shown in FIG. 19c, these two light beams are guided to the light-receiving elements 42 and 43 so that a focusing error signal Fo can be detected by using a wedge prism method. A tracking error signal Tr can be detected from a difference in output between the two light-receiving elements 42 and 43.

Each of the light-receiving elements 42 and 43 is divided into two sections. The magneto-optical signal Rf, the focusing error signal Fo and the tracking error signal Tr can be provided by the following formulas using light-receiving amounts a and b of the respective light-receiving elements 40 and 41, light-receiving amounts c and d of the two divided sections of the light-receiving element 42, and light-receiving elements e and f of the two divided sections of the light-receiving element 43.

$$Rf = a - b \tag{12}$$

$$Fo = (c+f) - (d+e) \tag{13}$$

$$Tr = (c+d) - (e+f) \tag{14}$$

As mentioned above, the light branching diffraction grating 36 is formed in the first light beam splitting element 34 and the polarizing/separating diffraction grating 39 is formed in the second light beam splitting element 37. Thus, the reflected light from the magneto-optical disk 33 is separated into plus and minus first order lights so as to detect the magneto-optical signal, the focusing error signal and the tracking error signal. Accordingly, it is possible to make a magneto-optical head section compact and light in weight in comparison with the general optical information recording/reproducing apparatus. The light-receiving elements 40 and 41 for detecting the magneto-optical signal are separated from the light-receiving elements 42 and 43 for detecting the focusing error signal and the tracking error signal. Therefore, it is possible to reduce a burden of an electric circuit in signal processing.

In this embodiment, the light branching diffraction grating 36 and the polarizing/separating diffraction grating 39 are formed on the respective substrates 35 and 38 separated from each other. This is because a shift in angle of diffraction caused by a change in wavelength is reduced by increasing the pitch of the light branching diffraction grating 36 and reducing the angle of diffraction thereof so as to remove a bad influence upon the focusing error signal. Accordingly, similar effects can be obtained in a range in which there is no problem about an offset to the focusing error signal even when the light branching diffraction grating 36 and the polarizing/separating diffraction grating 39 are disposed on both sides of the same substrate.

Figure 20:
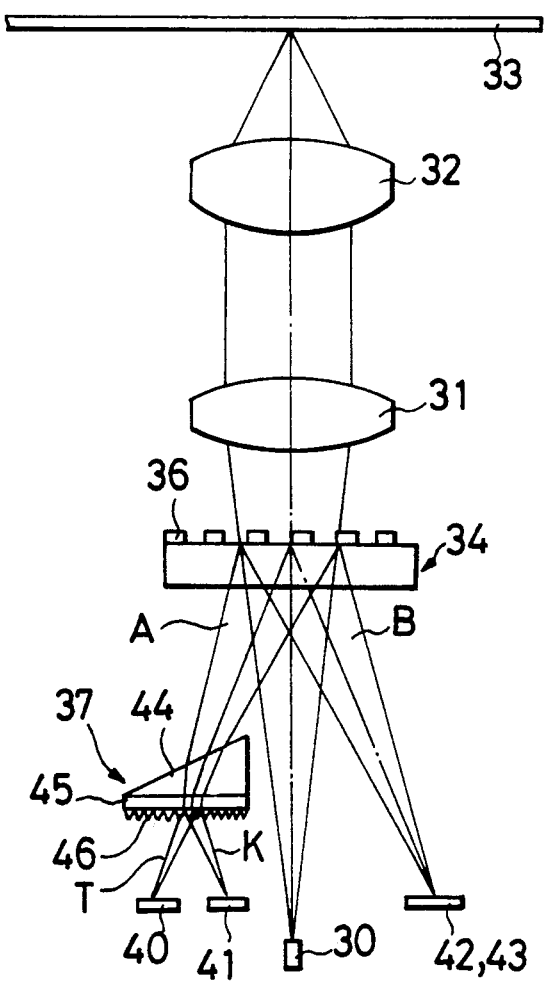
FIG. 20 is a view showing the construction of an apparatus for recording and reproducing optical information in accordance with a fourth embodiment of the present invention.

An optical information recording/reproducing apparatus in a fourth embodiment of the present invention will next be described with reference to FIG. 20. In this embodiment, the construction of a second light beam splitting element 37 is different from that of the second light beam splitting element 37 in the third embodiment shown in FIG. 17. The other constructions are similar to those in the third embodiment.

The second light beam splitting element 37 as a second light beam splitting means is constructed by a prism 44, a ½ wavelength plate 45 and a diffraction grating 46 for polarizing and separating light. In this optical information recording/reproducing apparatus, zeroth order light is emitted from a semiconductor laser 30 through the light branching diffraction grating 36. The zeroth order light is then changed to a parallel light beam by a collimator lens 31 and is converged by an objective lens 32 on a face of a magneto-optical disk 33. Light reflected from the magneto-optical disk 33 is incident to the light branching diffraction grating 36 through the objective lens 32 and the collimator lens 31 and is then separated into plus first order light A and minus first order light B. In this case, similar to the above third embodiment, the minus first order light B is guided to light-receiving elements 42 and 43 so as to detect a focusing error signal Fo and a tracking error signal Tr.

In contrast to this, the plus first order light A is incident to the prism 44 of the second light beam splitting element 37. An incident angle of the plus first order light A with respect to the prism 44 is set to a Brewster angle such that an apparent Kerr rotational angle is increased to detect an electric signal with high sensitivity. Accordingly, a plane of polarization of light transmitted through the prism 44 is rotated by the ½ wavelength plate 45 and this light is separated into transmission light T and diffraction light K by the polarizing-/separating diffraction grating 46. It is possible to detect a magneto-optical signal Rf from a difference in intensity between the transmission light T and the diffraction light K.

In the fourth embodiment, the second light beam splitting element 37 is integrally constructed by the prism 44, the ½ wavelength plate 45 and the polarizing-/separating diffraction grating 46. In accordance with such a structure, the optical information recording/reproducing apparatus can be made compact and an electric signal can be detected with high sensitivity.

Figure 21:
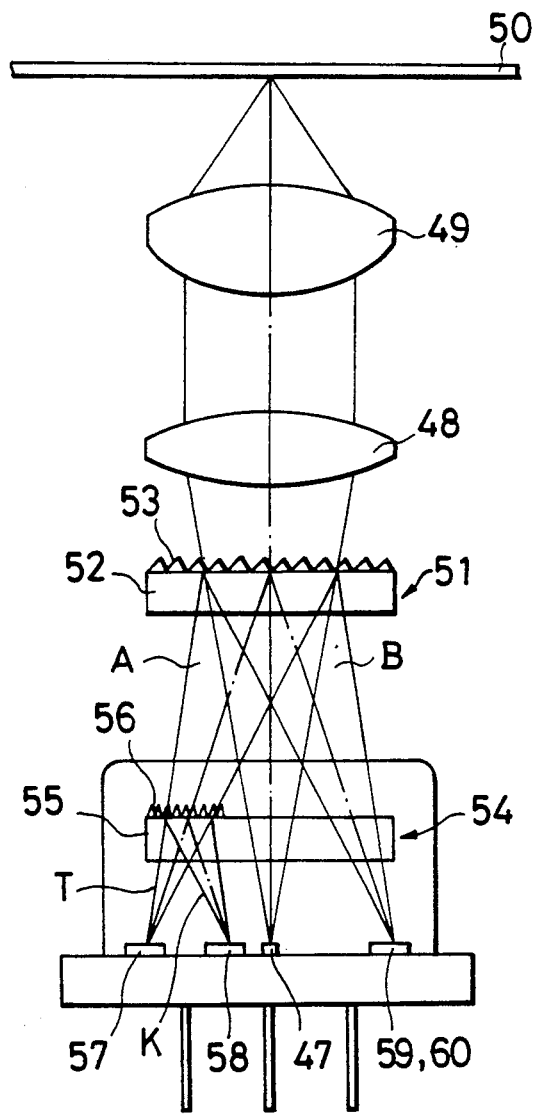
FIG. 21 is a view showing the construction of an apparatus for recording and reproducing optical information in accordance with a fifth embodiment of the present invention.
Figure 22:
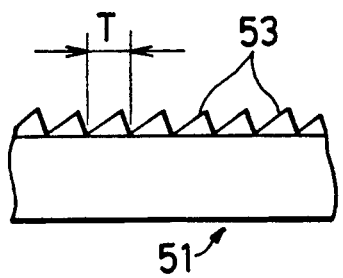
FIG. 22 is a cross-sectional view showing a sectional shape of a light branching diffraction grating in the fifth embodiment.

An optical information recording/reproducing apparatus in a fifth embodiment of the present invention will next be described with reference to FIGS. 21 to 24. In FIG. 21, light is emitted from a semiconductor laser 47 as a laser beam source and is changed to a parallel light beam by a collimator lens 48. The parallel light beam is converged by an objective lens 49 and is then irradiated onto a face of a magneto-optical disk 50 as an optical information recording medium. Thereafter, light reflected from the magneto-optical disk 50 is again transmitted through the objective lens 49 and the collimator lens 48. A first light beam splitting element 51 as a first light beam splitting means is disposed on an optical path from the collimator lens 48 to the semiconductor laser 47. A light branching diffraction grating 53 is formed on a substrate 52 in the first light beam splitting element 51 and is located on a side of the first light beam splitting element 51 facing the collimator lens 48. As shown in FIG. 22, the light branching diffraction grating 53 has an asymmetric shape within one periodic pitch T thereof on right-handed and left-handed sides of this light branching diffraction grating.

A second light beam splitting element 54 is disposed between the first light beam splitting element 51 and the semiconductor laser 47. A diffraction grating 56 for polarizing and separating light is formed on a substrate 55 in the second light beam splitting element 54 and is located on a side of the second light beam splitting element 54 facing the first light beam splitting element 51. Light-receiving elements 57 to 60 shown in FIGS. 24a to 24c are disposed between the second light beam splitting element 54 and the semiconductor laser 47.

In such an optical information recording/reproducing apparatus, light emitted from the semiconductor laser 47 is incident to the light branching diffraction grating 53 of the first light beam splitting element 51 through the substrate 55 of the second light beam splitting element 54. This zeroth order light is transmitted toward the collimator lens 48 and is then changed to a parallel light beam by this collimator lens 48. This parallel light beam is converged by the objective lens 49 on a face of the magneto-optical disk 50, thereby recording optical information onto the magneto-optical disk, etc. A plane of polarization of light provided an electric signal read on the magneto-optical disk is rotated by Kerr effect and this light is reflected from the magneto-optical disk 50. The reflected light from the magneto-optical disk is again incident to the light branching diffraction grating 53 through the objective lens 49 and the collimator lens 48, thereby forming plus first order light A and minus first order light B.

In this case, diffraction efficiencies of the plus first order light A and the minus first order light B are different from each other since the light branching diffraction grating 53 has an asymmetric shape within one periodic pitch T thereof on right-handed and left-handed sides of this light branching diffraction grating. Accordingly, intensities of the plus first order light A and the minus first order light B are different from each other. In a general magneto-optical pickup, 60 to 80 percent of the reflected light from the magneto-optical disk 50 is used to detect a magneto-optical signal and the remaining 40 to 20 percent of this reflected light is used to detect light control signals such as a focusing error signal and a tracking error signal so as to improve detection sensitivity of the magneto-optical signal. Accordingly, a large amount of light is required to detect the magneto-optical signal so that a cross-sectional shape of the light branching diffraction grating 53 is formed such that the intensity of the plus first order light A is stronger than that of the minus first order light B.

Such obtained plus first order light A is incident to the polarizing/separating diffraction grating 56 in the second light beam splitting element 54 and is separated into transmission light T and diffraction light K. The transmission light T and the diffraction light K are respectively guided to the light-receiving elements 57 and 58. As shown in FIG. 23, the light branching diffraction grating 53 has a small pitch and deep grooves, and diffraction efficiency of this light branching diffraction grating 53 depends on a polarizing direction of the incident light. Accordingly, effects similar to those of PBS and a Wollaston prism used as a general polarizing-/separating element can be obtained in the light branching diffraction grating 53. Thus, a magnetooptic signal Rf can be detected by using difference calculus from a difference in intensity between the transmission light T and the diffraction light K separated by the polarizing- /separating diffraction grating 56 every polarizing direction. As shown in FIGS. 24a and 24b, it is not necessary to divide the two light-receiving elements 57 and 58 and a shift in position of a light spot caused by a change in wavelength thereof can be sequentially absorbed by the size of a light-receiving face of each of these light-receiving elements.

The minus first order light B is divided into two light beams by the light branching diffraction grating 53. These two light beams are guided to the light-receiving elements 59 and 60 shown in FIG. 24c so that a focusing error signal Fo can be detected by using a wedge prism method. A tracking error signal Tr can be detected from a difference in output between the two light-receiving elements 59 and 60.

Each of the light-receiving elements 59 and 60 is divided into two sections. The magneto-optical signal Rf, the focusing error signal Fo and the tracking error signal Tr can be provided by the following formulas using light-receiving amounts a and b of the respective light-receiving elements 57 and 58, light-receiving amounts c and d of the two divided sections of the light-receiving element 59, and light-receiving elements e and f of the two divided sections of the light-receiving element 60.

$$Rf = a - b \tag{15}$$

$$Fo = (c+f) - (d+e) \tag{16}$$

$$Tr = (c+d) - (e+f) \tag{17}$$

As mentioned above, the light branching diffraction grating 53 is formed in the first light beam splitting element 51 and the polarizing/separating diffraction grating 56 is formed in the second light beam splitting element 54. Thus, light reflected from the magneto-optical disk 50 is separated into plus and minus first order lights to detect the magneto-optical signal, the focusing error signal and the tracking error signal. Accordingly, it is possible to make a magneto-optical head section compact and light in weight in comparison with the general optical information recording/reproducing apparatus. The light-receiving elements 57 and 58 for detecting the magneto-optical signal are separated from the light-receiving elements 59 and 60 for detecting the focusing error signal and the tracking error signal. Therefore, it is possible to reduce a burden of an electric circuit in signal processing.

In this embodiment, the light branching diffraction grating 53 and the polarizing/separating diffraction grating 56 are formed on the respective substrates 52 and 55 separated from each other. This is because a shift in angle of diffraction caused by a change in wavelength is reduced by increasing the pitch of the light branching diffraction grating 53 and reducing the angle of diffraction thereof so as to remove a bid influence upon the focusing error signal. Accordingly, similar effects can be obtained in a range in which there is no problem about an offset to the focusing error signal even when the light branching diffraction grating 53 and the polarizing/separating diffraction grating 56 are disposed on both sides of the same substrate.

Figure 25A:
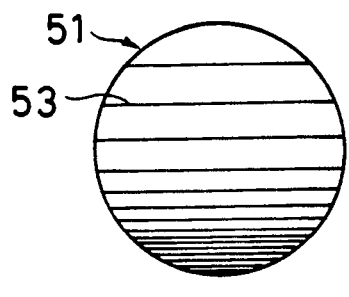
FIG. 25a is a front view showing a surface shape of the light branching diffraction grating having a modulated pitch.
Figure 25B:
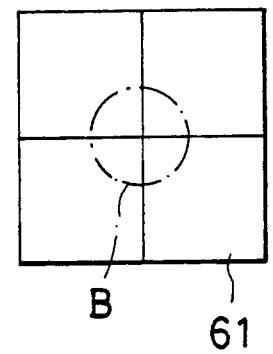

A modified example of the optical information recording/reproducing apparatus in the fifth embodiment of the present invention will next be described with reference to FIGS. 25a and 25b. In this modified example, the grating shape of a light branching diffraction grating 53 is different from that in the fifth embodiment shown in FIG. 21. The other constructions are similar to those in the fifth embodiment.

Similar to the light branching diffraction grating 53 shown in FIG. 22, the light branching diffraction grating 53 in this modified example has an asymmetric sectional shape within one periodic pitch T thereof on right-handed and left-handed sides of this light branching diffraction grating. As shown in FIG. 25a, the light branching diffraction grating 53 in this modified example is further formed as a linear grating having a surface shape having a modified pitch. In this case, astigmatism is caused since the light branching diffraction grating 53 has a unidirectional convergent function similar to the function of a cylindrical lens by forming this light branching diffraction grating 53 as a grating having the modified pitch. A light beam causing such astigmatism is used as a beam for the minus first order light B and is irradiated onto a light-receiving element 61 divided into four sections as shown in FIG. 25b. Thus, a focusing error signal and a tracking error signal can be respectively detected by an astigmatic method and a push-pull method.

Figure 26A:
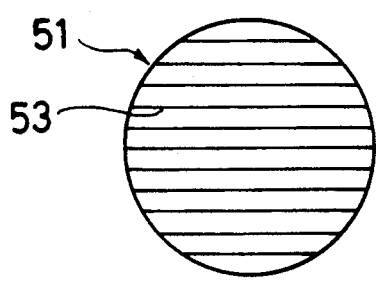
FIG. 26a is a front view showing a surface shape of the light branching diffraction grating having an equal pitch.
Figure 26B:
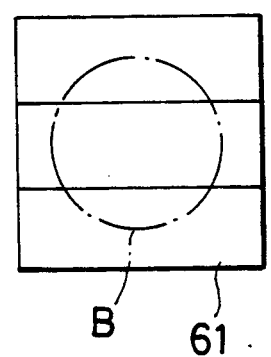

When the focusing error signal is detected by using a beam size method, the light branching diffraction grating 53 is formed as a linear grating having an equal pitch as shown in FIG. 26a. It is not necessary that the light branching diffraction grating 53 has the unidirectional convergent function. At this time, the light-receiving element 61 is divided into three sections as shown in FIG. 26b and the focusing error signal can be detected by making the minus first order light B incident to the light-receiving element 61. Similar to the light branching diffraction grating 53 shown in FIG. 22, the light branching diffraction grating 53 having an equal pitch has an asymmetric sectional shape within one periodic pitch T thereof on right-handed and left-handed sides of this light branching diffraction grating.

As mentioned above, a first structure of the present invention resides in an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal are detected by detecting light reflected from the optical information recording medium by a light-receiving element. This optical information recording/reproducing apparatus includes light beam splitting means arranged on an optical path between the laser beam source and the optical information recording medium. The light beam splitting means has a three-beam forming diffraction grating for dividing the light beam emitted from the laser beam source into three beams and formed on one face of the light beam splitting means on a light-emitting side thereof; a light branching diffraction grating for branching the light reflected from the optical information recording medium and formed on another face of the light beam splitting means; and a polarizing/separating diffraction grating for polarizing and separating a light beam branched by the light branching diffraction grating and formed on the same plane as the three-beam forming diffraction grating.

In the first structure of the present invention, the light beam splitting means is formed by three diffraction gratings composed of the three-beam forming diffraction grating, the light branching diffraction grating and the polarizing/separating diffraction grating. Accordingly, it is possible to simultaneously detect a magneto-optical signal in addition to the focusing error signal and the tracking error signal. Therefore, the optical information recording/reproducing apparatus can be made compact and these signals can be stably detected at any time.

A second structure of the present invention resides in an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal are detected by detecting light reflected from the optical information recording medium by a light-receiving element. This optical information recording/reproducing apparatus includes light beam splitting means arranged on an optical path between the laser beam source and the optical information recording medium. This light beam splitting means has a beam shaping element for converging the light beam emitted from the laser beam source in one direction and formed on one face of the light beam splitting means on a light-emitting side thereof; a light branching diffraction grating for branching the light reflected from the optical information recording medium and formed on another face of the light beam splitting means; and a polarizing/separating diffraction grating for polarizing and separating a light beam branched by the light branching diffraction grating and having diffractive efficiencies different from each other in accordance with a polarizing direction. The polarizing/separating diffraction grating is formed on the same plane as the beam shaping element.

In the second structure of the present invention, the light beam splitting means is formed by three constructional elements composed of the beam shaping element, the light branching diffraction grating and the polarizing/separating diffraction grating. Accordingly, it is possible to simultaneously provide three functions composed of a beam shaping function, a light branching function and a polarizing/separating function for the light beam splitting means as a single constructional member. Therefore, the optical information recording/reproducing apparatus can be made compact and cheaply manufactured.

In a third structure of the present invention, the beam shaping element, the light branching diffraction grating and the polarizing/separating diffraction grating forming the light beam splitting means are integrally molded on a substrate made of glass or plastic. Accordingly, the optical information recording/reproducing apparatus can be made compact and the above signals can be stably detected at any time irrespective of a change with the passage of time.

A fourth structure of the present invention resides in an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal are detected by detecting light reflected from the optical information recording medium by light-receiving element. This optical information recording/reproducing apparatus has first light beam splitting means arranged on an optical path between the laser beam source and the collimator lens and having a light branching diffraction grating for separating the emitted and reflected lights into zeroth order light and plus and minus first order lights; and second light beam splitting means arranged on one of optical paths of the plus and minus first order lights obtained by transmitting the reflected light from the optical information recording medium through the first light beam splitting means. The second light beam splitting means includes a polarizing/separating diffraction grating having diffraction efficiency depending on a polarizing direction.

In the fourth structure of the present invention, a magneto-optical signal can be detected by using one of the plus and minus first order lights branched by transmitting the reflected light from the optical information recording medium through the light branching diffraction grating. The focusing error signal and the tracking error signal can be detected by using the other first order light through the polarizing/separating diffraction grating. Accordingly, it is possible to increase tolerances in assembly of an optical system and adjustment thereof. Further, the construction of the optical information recording/reproducing apparatus can be simplified by disposing the light branching diffraction grating and the polarizing/separating diffraction grating.

A fifth structure of the present invention resides in an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal are detected by detecting light reflected from the optical information recording medium by a light-receiving element. This optical information recording/reproducing apparatus has first light beam splitting means arranged on an optical path between the laser beam source and the collimator lens and having a light branching diffraction grating for separating the emitted and reflected lights into zeroth order light and plus and minus first order lights; and second light beam splitting means arranged on one of optical paths of the plus and minus first order lights obtained by transmitting the reflected light from the optical information recording medium through the first light beam splitting means. The second light beam splitting means includes a prism, a $\frac{1}{4}$ wavelength plate and a polarizing/separating diffraction grating having diffraction efficiency depending on a polarizing direction. The prism, the $\frac{1}{4}$ wavelength plate and the polarizing/separating diffractive grating are integrally formed.

In the fifth structure of the present invention, the prism having a set incident angle is disposed on an optical path for detecting a magnetooptic signal so that an apparent Kerr rotational angle of light incident to this prism at a Brewster angle is increased. Accordingly, the magneto-optical signal can be detected with high sensitivity.

A sixth structure of the present invention resides in an apparatus for recording and reproducing optical information in which light emitted from a laser beam source is changed to a parallel light beam by a collimator lens and is converged and irradiated by an objective lens onto a surface of an optical information recording medium to record the optical information onto the optical information recording medium, and the optical information is reproduced and a focusing error signal and a tracking error signal are detected by detecting light reflected from the optical information recording medium by a light-receiving element. This optical information recording/reproducing apparatus has first light beam splitting means arranged on an optical path between the laser beam source and the collimator lens and having a light branching diffraction grating for separating the emitted and reflected lights into zeroth order light and plus and minus first order lights; and second light beam splitting means arranged on one of optical paths of the plus and minus first order lights obtained by transmitting the reflected light from the optical information recording medium through the first light beam splitting means. The second light beam splitting means includes a polarizing/separating diffraction grating having diffraction efficiency depending on a polarizing direction. The light branching diffracting grating has an asymmetric shape within one periodic pitch thereof on right-handed and left-handed sides of this light branching diffraction grating.

In the sixth structure of the present invention, the light branching diffracting grating for separating the emitted and reflected lights into the zeroth order light and the plus and minus first order lights has an asymmetric shape within one periodic pitch thereof on the right-handed and left-handed sides of this light branching diffraction grating. Accordingly, it is possible to change the diffraction efficiency of each of the plus and minus first order lights branched by transmitting the reflected light from the optical information recording medium through the light branching diffraction grating. Therefore, light intensity with respect to a magneto-optical signal can be adjusted such that this light intensity is increased. Thus, light utilization efficiency is improved and an optical signal can be detected with high sensitivity in comparison with the general optical information recording/reproducing apparatus. Further, the magneto-optical signal is detected by using one of the plus and minus first order lights branched by the light branching diffracting grating. The focusing error signal and the tracking error signal are detected by transmitting the other first order light through the polarizing/separating diffraction grating. Accordingly, it is possible to increase tolerances in assembly of an optical system and adjustment thereof. Further, the construction of the optical information recording/reproducing apparatus can be simplified by disposing the light branching diffraction grating and the polarizing/separating diffraction grating.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magneto-optical information recording/reproducing apparatus in which light emitted from a laser beam source is parallelized by a collimator lens and is converged by an objective lens and is caused thereby to impinge onto a surface of a magneto-optical information recording medium thereby to record information onto the magneto-optical information recording medium, and the information is reproduced and a focusing error signal and a tracking error signal are detected by detecting light reflected from the magneto-optical information recording medium by a light-receiving element, said apparatus comprising:
   a light beam splitting means arranged on an optical path between said laser beam source and said magneto-optical information recording medium, said light beam splitting means including:
   a beam shaping element for converging the light beam emitted from said laser beam source in one direction and formed on a first face of the light beam splitting means facing the laser beam source,
   a light branching diffraction grating for branching the light reflected from said magneto-optical information recording medium and formed on a second face of the light beam splitting means facing away from the laser beam source, and
   a polarizing/separating diffraction grating for polarizing and separating a light beam branched by said light branching diffraction grating and formed on the same plane as said beam shaping element, a diffraction efficiency of said polarizing/separating diffraction grating changing in accordance with a polarizing direction, wherein
   said beam shaping element, said light branching diffraction grating and said polarizing/separating diffraction grating are integrally formed on a substrate.

2. A magneto-optical information recording/reproducing apparatus according to claim 1, wherein said substrate is made of glass.

3. A magneto-optical information recording/reproducing apparatus according to claim 1, wherein said substrate is made of plastic.

4. A magneto-optical information recording/reproducing apparatus according to claim 1, wherein said beam shaping element comprises a cylindrical micro Fresnel lens converting a beam having an elliptical cross-section into a beam having a circular cross-section.

* * * * *